United States Patent
Yamaguchi et al.

(10) Patent No.: US 9,966,896 B2
(45) Date of Patent: May 8, 2018

(54) MOTOR DRIVE DEVICE ASSEMBLY INCLUDING PLURALITY OF MOTOR DRIVE DEVICES, AND MOTOR DRIVE DEVICE INCLUDING HEATSINK

(71) Applicant: FANUC CORPORATION, Yamanashi (JP)

(72) Inventors: Ryouta Yamaguchi, Yamanashi (JP); Taku Sasaki, Yamanashi (JP); Kiichi Inaba, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/246,641

(22) Filed: Aug. 25, 2016

(65) Prior Publication Data

US 2017/0063285 A1 Mar. 2, 2017

(30) Foreign Application Priority Data

Sep. 2, 2015 (JP) ................... 2015-173010

(51) Int. Cl.
*G05B 11/32* (2006.01)
*H02P 29/60* (2016.01)
(Continued)

(52) U.S. Cl.
CPC .............. *H02P 29/60* (2016.02); *H02P 29/02* (2013.01); *H02P 29/68* (2016.02); *H02M 7/003* (2013.01)

(58) Field of Classification Search
CPC ...... H02P 29/60; H02P 29/68; H02P 29/0088; H02P 5/56; G01K 11/00; G01K 13/00; G01K 7/427
(Continued)

(56) References Cited

U.S. PATENT DOCUMENTS 5,424,916 A * 6/1995 Martin ............... H05K 7/20636
165/80.4
2005/0253465 A1* 11/2005 Takenaka ................. H02K 5/20
310/52
(Continued)

FOREIGN PATENT DOCUMENTS

JP 5948094 U 3/1984
JP 2003259657 A 9/2003
(Continued)

OTHER PUBLICATIONS

English Abstract and Machine Translation for Japanese Publication No. 2014-207209 A, published Oct. 30, 2014, 8 pgs.
(Continued)

*Primary Examiner* — Eduardo Colon Santana
*Assistant Examiner* — Gabriel Agared
(74) *Attorney, Agent, or Firm* — Fredrikson & Byron, P.A.

(57) ABSTRACT

A motor drive device assembly capable of suppressing differences in temperatures of motor drive devices depending on operational conditions. The motor drive device assembly includes a first motor drive device including a first heatsink, a second motor drive device located adjacent to the first motor drive device and including a second heatsink formed separately from the first heatsink, and a connection part connecting the first heatsink and the second heatsink to each other, to allow thermal conduction between the first heatsink and the second heatsink.

8 Claims, 6 Drawing Sheets

(51) Int. Cl.
 *H02P 29/02* (2016.01)
 *H02P 29/68* (2016.01)
 *H02M 7/00* (2006.01)

(58) Field of Classification Search
 USPC .......................................................... 318/625
 See application file for complete search history.

(56) References Cited

U.S. PATENT DOCUMENTS

| | | | |
|---|---|---|---|
| 2005/0280998 A1* | 12/2005 | Lin ........................ | H05K 7/209 |
| | | | 361/704 |
| 2006/0158140 A1* | 7/2006 | Furuki .................... | H02P 7/298 |
| | | | 318/68 |
| 2009/0109429 A1* | 4/2009 | Scott ...................... | G01N 21/88 |
| | | | 356/237.1 |
| 2010/0254093 A1* | 10/2010 | Oota ................... | B60R 16/0239 |
| | | | 361/720 |

FOREIGN PATENT DOCUMENTS

| | | |
|---|---|---|
| JP | 2004158757 A | 6/2004 |
| JP | 2007209062 A | 8/2007 |
| JP | 201081765 A | 4/2010 |
| JP | 2014207209 A | 10/2014 |

OTHER PUBLICATIONS

English Abstract and Machine Translation for Japanese Publication No. 2010-081765 A, published Apr. 8, 2010, 16 pgs.
English Abstract and Machine Translation for Japanese Publication No. 2004-158757 A, published Jun. 3, 2004, 16 pgs.
English Abstract and Machine Translation for Japanese Publication No. 2007-209062 A, published Aug. 16, 2007, 5 pgs.
English Abstract and Machine Translation for Japanese Publication No. 2003-259657 A, published Sep. 12, 2003, 9 pgs.
English Abstract and Machine Translation for Japanese Publication No. 59-48094 U, published Mar. 30, 1984, 5 pgs.

* cited by examiner

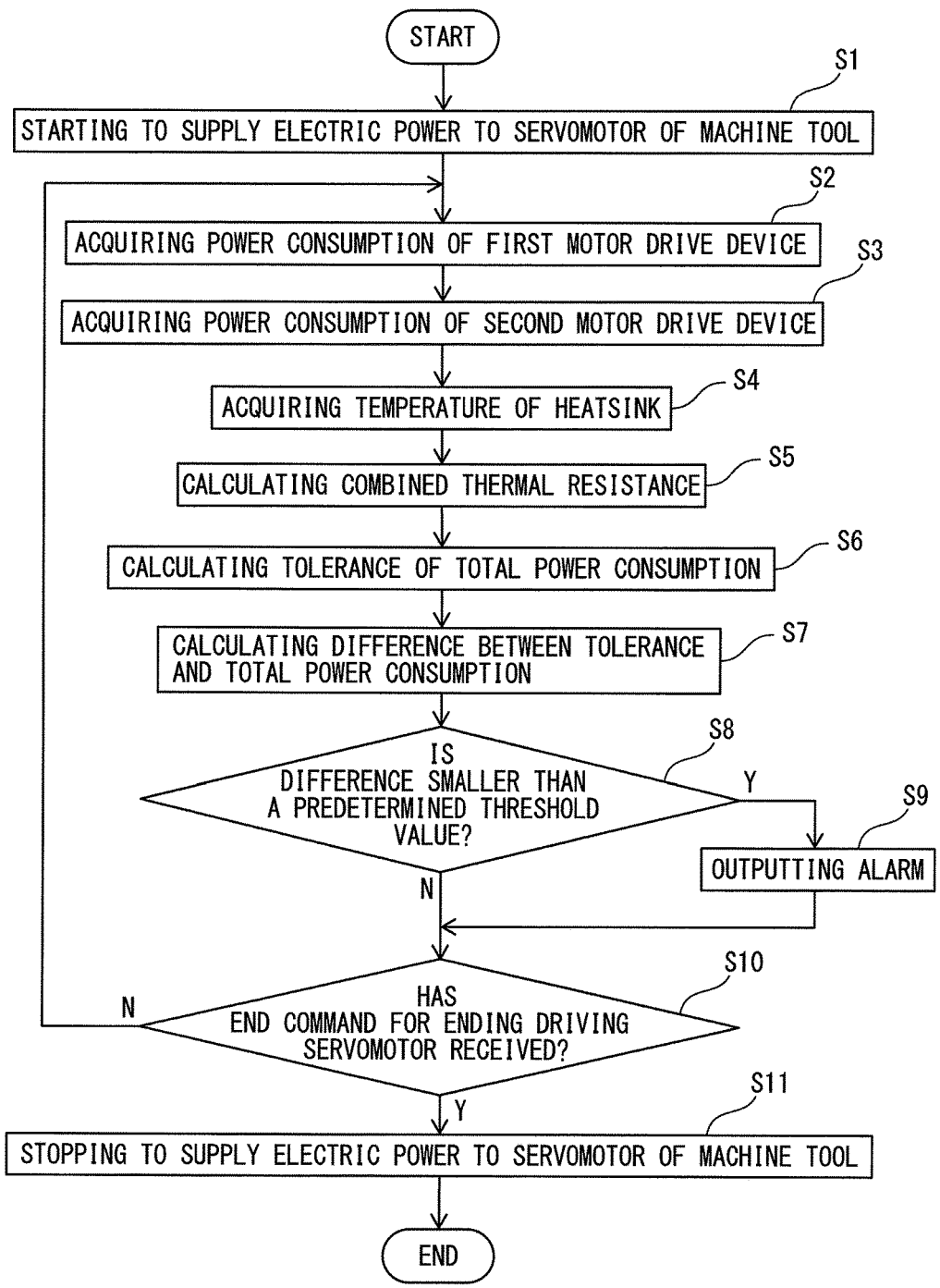

MOTOR DRIVE DEVICE ASSEMBLY INCLUDING PLURALITY OF MOTOR DRIVE DEVICES, AND MOTOR DRIVE DEVICE INCLUDING HEATSINK

BACKGROUND

1. Field of the Invention

The invention relates to a motor drive device assembly including a plurality of motor drive devices, and a motor drive device including a heatsink.

2. Description of the Related Art

Motor drive devices including a heatsink are known, for example as disclosed in Japanese Laid-open Patent Publication No. 2007-209062.

To drive servomotors incorporated in a machine tool or an industrial robot or the like, in some cases a plurality of motor drive devices are densely located in a control panel. When the motor drive devices are in operation, the power consumption of each of the motor drive devices may become different depending on operating conditions, which thus may lead to differences in temperature among the motor drive devices.

Such differences in temperature may provoke uneven service life of electronic elements provided in the motor drive device. Therefore, it is desired to develop a technique to suppress unevenness in temperature among the motor drive devices originating from differences depending on operating conditions.

SUMMARY OF INVENTION

In an aspect of the invention, a motor drive device assembly comprises a first motor drive device including a first heatsink, and a second motor drive device arranged adjacent to the first motor drive device and including a second heatsink separated from the first heatsink.

Further, the motor drive device assembly comprises a connection part which connects the first heatsink and the second heatsink to each other so as to allow thermal conduction between the first heatsink and the second heatsink.

The connection part may directly connect the first heatsink and the second heatsink. The connection part may detachably connect the first heatsink and the second heatsink. The connection part may include a first engaging part formed at the first heatsink and a second engaging part formed at the second heatsink and releasably engaging the first engaging part.

The connection part may include a thermally conductive member separated from the first heatsink and the second heatsink and interposed between the first heatsink and the second heatsink so as to contact the first heatsink and the second heatsink. The thermally conductive member may be detachably connected to the first heatsink and the second heatsink. The thermally conductive member may include a radiator fin.

In another aspect of the invention, a motor drive device comprises a first heatsink, a first power-acquisition part which acquires power consumption of the motor drive device, and a communication part which communicates with a second motor drive device including a second heatsink connected to the first heatsink via a connection part which allows thermal conduction between the first heatsink and the second heatsink.

Further, the motor drive device comprises a second power-acquisition part which acquires power consumption of the second motor drive device via the communication part, and a temperature acquisition part which acquires a temperature of the first heatsink or the second heatsink.

Further, the motor drive device includes a thermal resistance calculation part which calculates combined thermal resistance of the first heatsink and the second heatsink, based on total power consumption of the power consumption of the motor drive device and the power consumption of the second motor drive device and on the temperature acquired by the temperature acquisition part.

Further, the motor drive device includes a tolerance calculation part which calculates tolerance of the total power consumption of the motor drive device and the second motor drive device, based on the combined thermal resistance calculated by the thermal resistance calculation part and on a predetermined allowable temperature of the motor drive device. The motor drive device may further comprise a power difference calculation part which calculates a difference between the tolerance calculated by the tolerance calculation part and the total power consumption.

BRIEF DESCRIPTION OF DRAWINGS

The above-mentioned or other objects, features, and advantages of the invention will be clarified by the following description of preferred embodiments with reference to the accompanying drawings, in which:

FIG. 6 is a flowchart of an example of an operation flow of the first motor drive device shown in FIG. 5.

DETAILED DESCRIPTION

Figure 1:
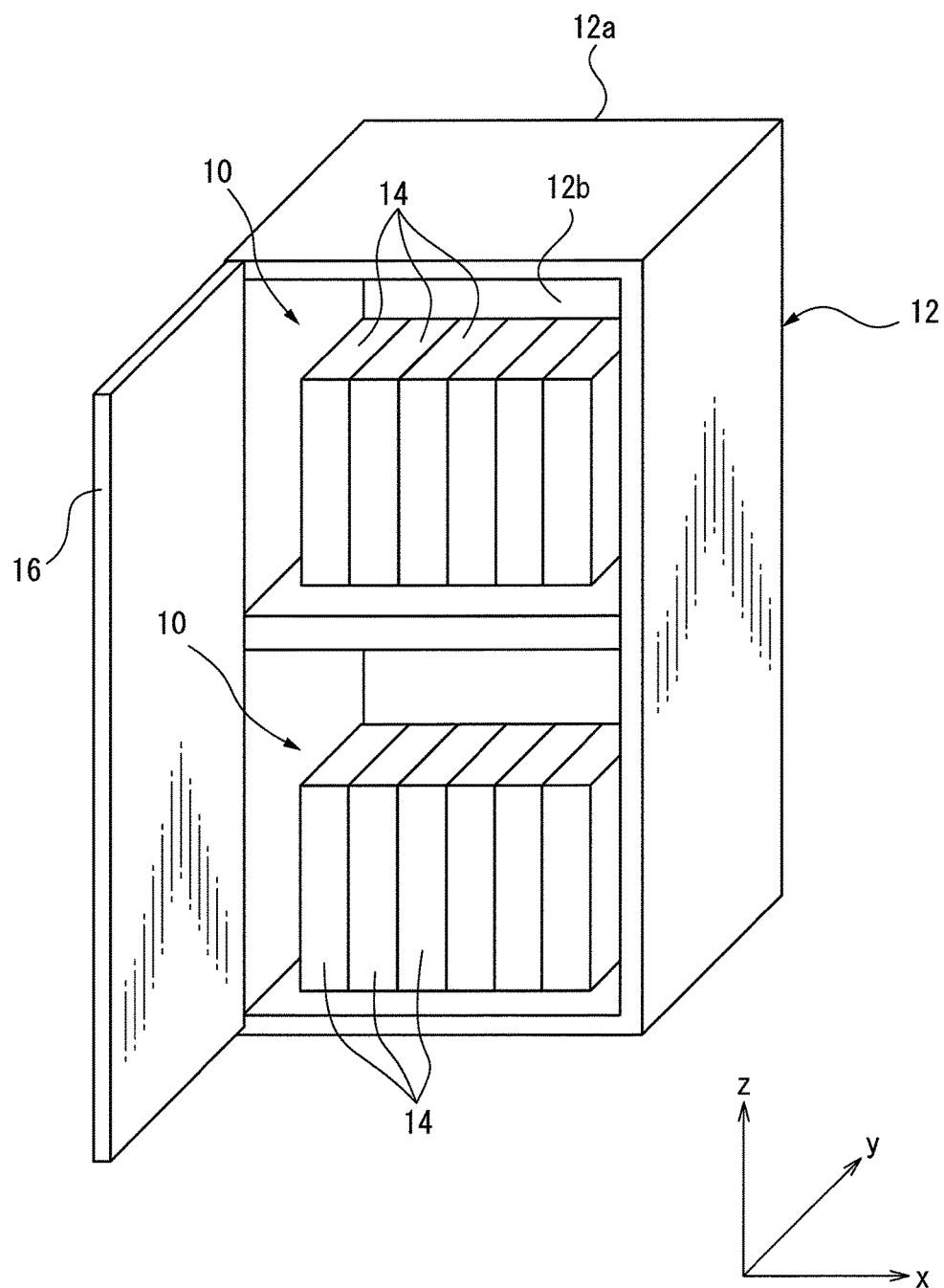
FIG. 1 is a perspective view of motor drive device assemblies, each of which is an embodiment of the invention and is placed in a control panel locker.
Figure 2:
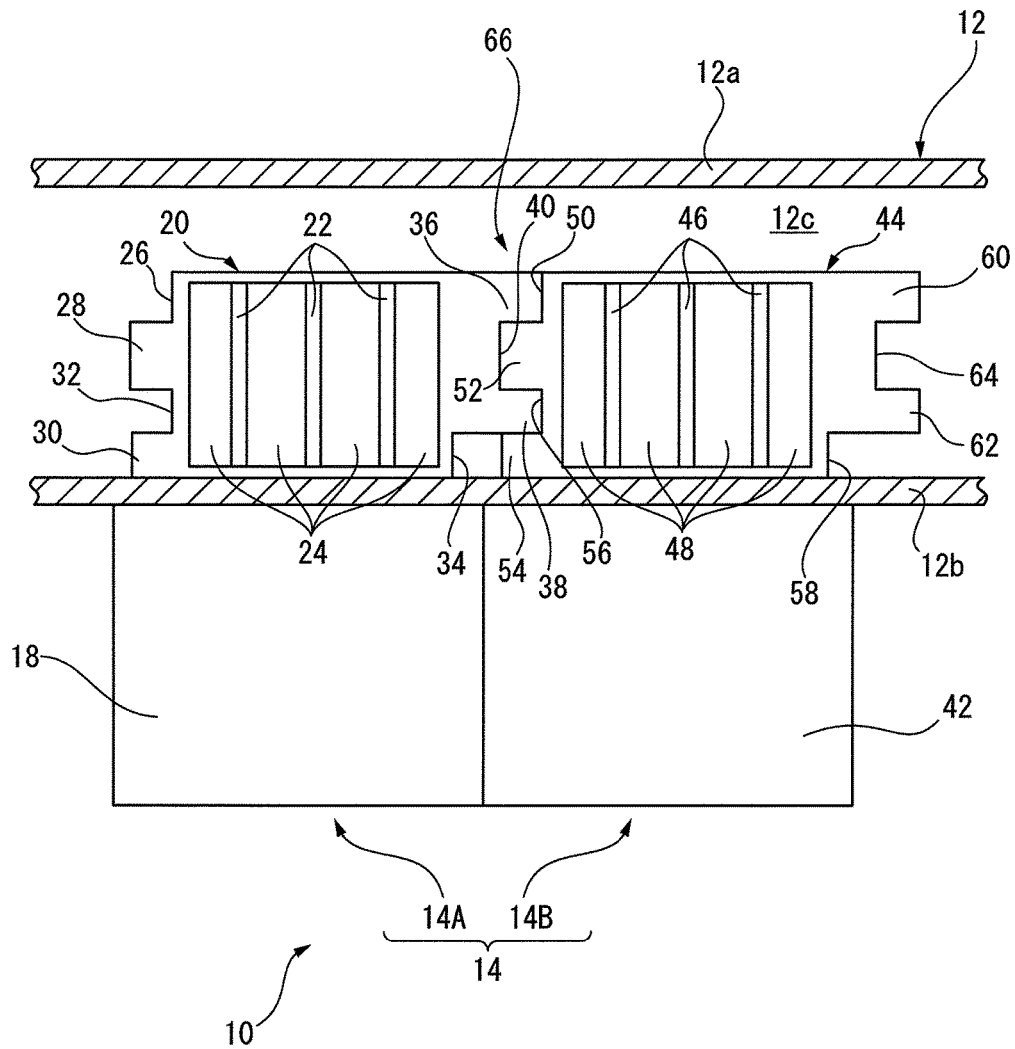
FIG. 2 is an enlarged view of a pair of motor drive devices arranged adjacent to each other, which constitutes the motor drive device assembly shown in FIG. 1.

Hereafter, embodiments of the invention will be described in detail based on the drawings. Referring to FIG. 1 and FIG. 2, a motor drive device assembly 10 according to an embodiment of the invention will be described. Note that, in the following description, directions indicated by Cartesian coordinate system shown in the drawings are used as a standard of direction, and for convenience, the x-axis plus direction is referred as a right direction (rightward), the y-axis plus direction is referred as a front direction (frontward), and the z-axis plus direction is referred as a upper direction (upward).

The motor drive device assembly 10 is housed in a hollow control panel locker 12 having a door 16 able to open and close. The motor drive device assembly 10 includes a plurality of motor drive devices 14.

Each of the motor drive devices is for supplying electric power to a servomotor incorporated in e.g. a machine tool or industrial robot, and includes a heatsink described later. FIG. 2 shows a first motor drive device 14A and a second motor drive device 14B among the plurality of motor drive devices 14, which are arranged adjacent to each other in the left-right direction.

The first motor drive device 14A includes a casing 18, electronic elements (not shown) housed in the casing 18, and a (first) heatsink 20 attached to the front side of the casing 18. The casing 18 is a hollow member made of e.g. a resin, and defines an internal space thereof. The electronic elements include a power element, electrolytic capacitor or the like, and are mounted in the internal space of the casing 18.

The heatsink 20 includes a plurality of radiator fins 22. Each of the radiator fins 22 extends between the upper end and the lower end of the heatsink 20. The radiator fins 22 are arranged so as to align in the left-right direction at substantially equal intervals.

A flow path 24 is defined between two radiator fins 22 adjacent to each other in the left-right direction. Each flow path 24 extends downward from the upper end to the lower end of the heatsink 20, and opens to the outside at each of the upper and lower ends of the heatsink 20. When air flows through the flow path 24, heat is dissipated from the heatsink 20.

A plurality of protrusions 28 and 30 is formed at a left end face 26 of the heatsink 20 so as to protrude leftward from the left end face 26. The protrusions 28 and 30 are arranged so as to align in the front-rear direction, wherein a recess 32 is defined between the protrusions 28 and 30.

Similarly, a plurality of protrusions 36 and 38 is formed at a right end face 34 of the heatsink 20 so as to protrude rightward from the right end face 34. The protrusions 36 and 38 are arranged so as to align in the front-rear direction, wherein a recess 40 is defined between the protrusions 36 and 38.

The electronic elements housed in the casing 18 are mounted on the heatsink 20, and heat generated in the electronic elements conducts to the heatsink 20, and is radiated therefrom.

The second motor drive device 14B has a configuration similar as the first motor drive device 14A. More specifically, the second motor drive device 14B includes a casing 42, electronic elements (not shown) housed in the casing 42, and a (second) heatsink 44 attached to the front side of the casing 42. The casing 42 is a hollow member made of e.g. a resin, and houses the electronic elements in the internal space thereof.

The heatsink 44 has a configuration similar as the heatsink 20, and arranged adjacent to the heatsink 20 on the right side. More specifically, the heatsink 44 includes a plurality of radiator fins 46. Each of the radiator fins 46 extends between the upper end and the lower end of the heatsink 44. The radiator fins 46 are arranged to align in the left-right direction at substantially equal intervals.

A flow path 48 is defined between two radiator fins 46 adjacent to each other in the left-right direction. Each flow path 48 extends downward from the upper end to the lower end of the heatsink 44, and opens to the outside at each of the upper and lower ends of the heatsink 44.

A plurality of protrusions 52 and 54 are formed at a left end face 50 of the heatsink 44 so as to protrude leftward from the left end face 50. The protrusions 52 and 54 are arranged to align in the front-rear direction, wherein a recess 56 is defined between the protrusions 52 and 54.

Similarly, a plurality of protrusions 60 and 62 are formed at a right end face 58 of the heatsink 44 so as to protrude rightward from the right end face 58. The protrusions 60 and 62 are arranged to align in the front-rear direction, wherein a recess 64 is defined between the protrusions 60 and 62.

The electronic elements housed in the casing 42 are mounted on the heatsink 44, and heat generated in the electronic elements conducts to the heatsink 44.

In this embodiment, the heatsink 20 and the heatsink 44 are detachably connected to each other via the protrusions 36, 38, 52, and 54, and the recesses 40 and 56. More specifically, the protrusion 38 (first engaging part) formed at the right end face 34 of the heatsink 20 is releasably engages the recess 56 (second engaging part) formed at the left end face 50 of the heatsink 44.

Similarly, the protrusion 52 (second engaging part) formed at the left end face 50 of the heatsink 44 is releasably engages the recess 40 (first engaging part) formed at the right end face 34 of the heatsink 20.

By these protrusions 38 and 52 and the recesses 40 and 56, the heatsink 20 and heatsink 44 are detachably connected directly to each other, thereby thermal conduction between the heatsinks 20 and 44 can be realized.

Thus, in this embodiment, the protrusions 36, 38, 52, and 54, and the recesses 40 and 56 constitute a connection part 66 which connects the heatsink 20 and heatsink 44 to each other so as to allow thermal conduction therebetween.

Through this connection part 66, heat generated in the heatsink 20 can conduct to the heatsink 44, while heat generated in the heatsink 44 can conduct to the heatsink 20. As a result, a heatsink assembly, which has a larger heat dissipation capacity than each of the heatsinks 20 and 44, can be constituted.

In this embodiment, the control panel locker 12 includes a front wall 12a and a plate-shaped panel 12b arranged opposite to the front wall 12a so as to be separated rearward from the front wall 12a. The panel 12b extends through the connection between the casing 18 and the heatsink 20, and through the connection between the casing 42 and the heatsink 44.

An air passage 12c is defined between the front wall 12a and the panel 12b. The air passage 12c is in fluid communication with outer air, and forms a flow path for the gas flowing in the air passage 12c. By the gas flowing through the air passage 12c, heat in the heatsink 20 and 44 can be removed.

According to this embodiment, an operator can connect the heatsinks 20 and 44 to each other via the connection part 66 or detach the heatsink 20 from the heatsink 44, depending on the conditions of operation of the first motor drive device 14A and the second motor drive device 14B.

As an example, assuming that the first and second motor drive devices 14A and 14B are operated under a condition in which the power consumption of the first motor drive device 14A is relatively large, while the power consumption of the second motor drive device 14B is relatively small.

In this case, if the heatsink 20 and the heatsink 44 are detached from each other, the temperatures of the electronic elements in the first motor drive device 14A may be higher than those in the second motor drive device 14B. Due to this, the service lifes of the electronic elements in the first motor drive device 14A may be shorter than those in the second motor drive device 14B.

According to this embodiment, the operator can connect the heatsink 20 and the heatsink 44 to each other via the connection part 66, in view of such a condition of operation.

In this case, thermal conduction between the heatsink 20 and the heatsink 44 can take place, thereby the heatsinks 20 and 44 function as a heatsink assembly having a larger heat dissipation capacity. Due to this, it is possible to uniformize the temperatures of the heatsinks 20 and 44.

Therefore, even if the first and second motor drive devices 14A and 14B are operated under the condition in which the power consumption of the first motor drive device 14A is larger than that of the second motor drive device 14B, the temperatures of the electronic elements in the first and second motor drive devices 14A and 14B can be uniformized.

As a result, it is possible to prevent differences in the service lives of the electronic elements in the first and second motor drive devices 14A and 14B from being occurred.

On the other hand, if the first and second motor drive devices 14A and 14B are operated under a condition in which the power consumption of the first motor drive device 14A and that of the second motor drive device 14B are both small, and therefore there is no need to connect the heatsinks 20 and 44 to each other, the operator can easily detach the heatsink 20 from the heatsink 44.

Next, referring to FIG. 3, a motor drive device assembly 70 according to another embodiment will be described. Note that, in various embodiments described below, elements similar to those of the already-mentioned embodiment will be assigned the same reference numeral, and detailed descriptions thereof will be omitted.

The motor drive device assembly 70 may be housed inside of the control panel locker 12, instead of the above-mentioned motor drive device assembly 10. The motor drive device assembly 70 includes a plurality of motor drive devices 72 and a connection part 74 which detachably connects heatsinks of two motor drive devices 72 arranged adjacent to each other.

Figure 3:
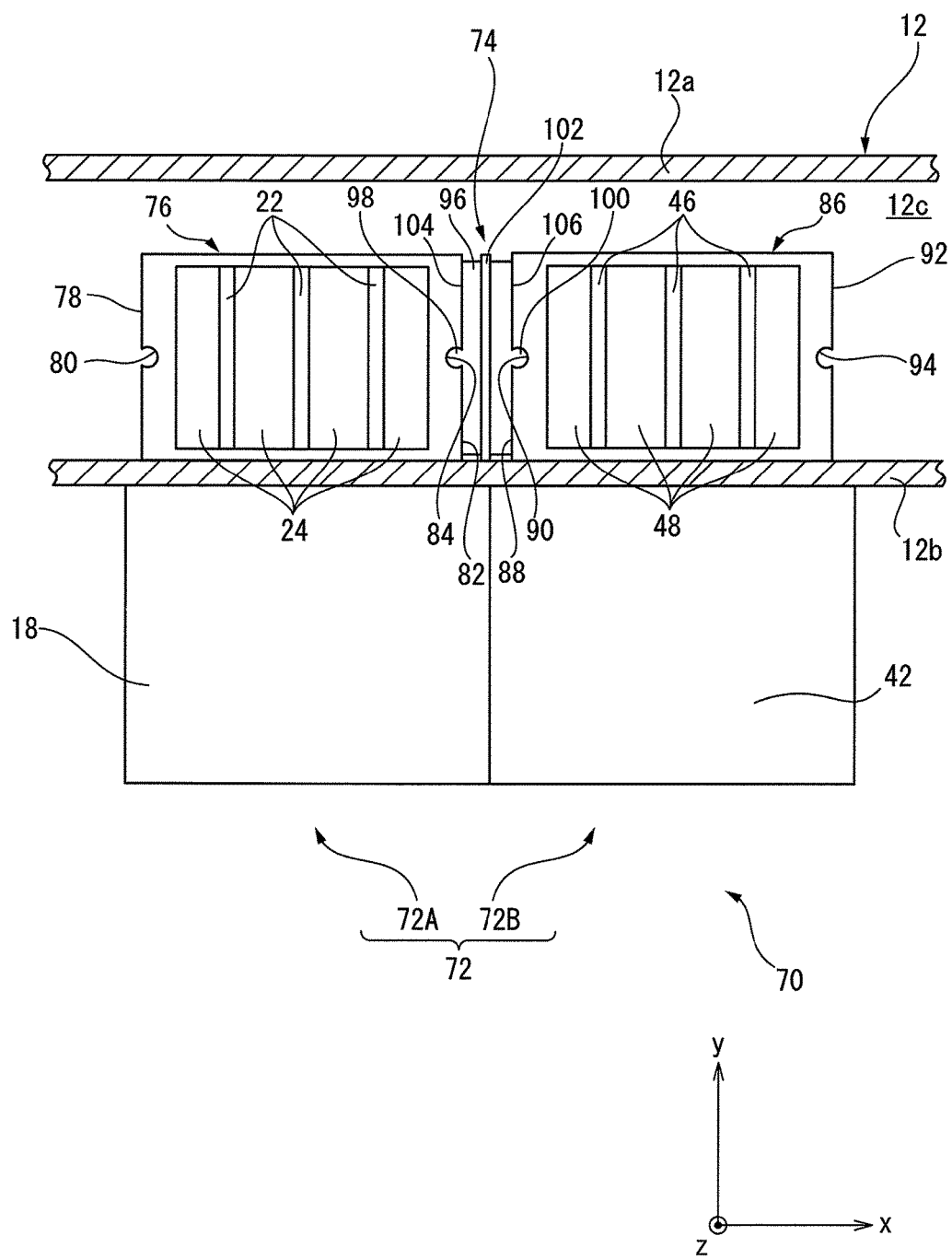
FIG. 3 is an enlarged view of a motor drive device assembly according to another embodiment.

FIG. 3 shows an enlarged view of a first motor drive device 72A and a second motor drive device 72B among the plurality of motor drive devices 72, which are arranged adjacent to each other in the left-right direction. The first motor drive device 72A includes the casing 18, the electronic elements (not shown) housed in the casing 18, and a (first) heatsink 76 attached to the front side of the casing 18.

The heatsink 76 includes the plurality of radiator fins 22, and the flow path 24 is defined between two radiator fins 22 adjacent to each other in the left-right direction.

A recess 80 is formed at a left end face 78 of the heatsink 76 so as to be recessed inward from the left end face 78, while a recess 84 is formed at a right end face 82 of the heatsink 76 so as to be recessed inward from the right end face 82.

The second motor drive device 72B has a configuration similar as the first motor drive device 72A. Specifically, the second motor drive device 72B includes the casing 42, the electronic elements (not shown) housed in the casing 42, and a (second) heatsink 86 attached to the front side of the casing 42.

The heatsink 86 includes the plurality of radiator fins 46, and the flow path 48 is defined between two radiator fins 46 adjacent to each other in the left-right direction.

A recess 90 is formed at a left end face 88 of the heatsink 86 so as to be recessed inward from the left end face 88, while a recess 94 is formed at a right end face 92 of the heatsink 86 so as to be recessed inward from the right end face 92.

Similar as the above-mentioned embodiment, the panel 12b of the control panel locker 12 extends through the connection between the casing 18 and the heatsink 76, and through the connection between the casing 42 and the heatsink 86.

The connection part 74 is comprised of a thermally conductive member separated from the heatsink 76 and the heatsink 86. The connection part 74 is interposed between the heatsink 76 and the heatsink 86 so as to contact the heatsinks 76 and 86.

More specifically, the connection part 74 includes a main body 96, protrusions 98 and 100, and a radiator fin 102. A left end face 104 of the main body 96 contacts the right end face 82 of the heatsink 76, while a right end face 106 of the main body 96 contact the left end face 88 of the heatsink 86.

The radiator fin 102 is a plate-shaped member formed so as to project out from an outer surface of the main body 96. Note that, although single radiator fin 102 is illustrated in FIG. 3, a plurality of radiator fins 102 may be arranged so as to be spaced away from each other.

The protrusion 98 is formed so as to protrude out from the left end face 104 of the main body 96. The protrusion 98 is configured to detachably engage the recess 84 formed at the right end face 82 of the heatsink 76.

The protrusion 100 is formed so as to protrude out from the right end face 106 of the main body 96. The protrusion 100 is configured to detachably engage the recess 90 formed at the left end face 88 of the heatsink 86.

Thus, the heatsink 76 and heatsink 86 are detachably connected to each other via the connection part 74. Through the connection part 74, thermal conduction between the heatsink 76 and heatsink 86 can be realized. As a result, a heatsink assembly, which has a larger cooling capacity than each of the heatsinks 76 and 86, is constituted.

According to this embodiment, similar to the above-mentioned embodiment, even under an operational condition in which the power consumption of the first motor drive device 72A is larger than that of the second motor drive device 72B, the temperatures of the heatsinks 76 and 86 can be uniformized.

Therefore, the temperatures of the electronic elements of the first and second motor drive devices 72A and 72B can be uniformized. Consequently, it is possible to prevent differences in the service lives of the electronic elements in the first and second motor drive devices 72A and 72B from being occurred.

Further, in this embodiment, since the connection part 74 is provided with the radiator fin 102, it is possible to improve the cooling capacity of the heatsink assembly constituted by the heatsinks 76 and 86.

Next, referring to FIG. 4, a motor drive device assembly 110 according to still another embodiment will be described. The motor drive device assembly 110 may be housed inside the control panel locker 12, instead of the above-mentioned motor drive device assembly 10. The motor drive device assembly 110 includes a plurality of motor drive devices 112 and a connection part 114 which connects heatsinks of two motor drive devices 112 arranged adjacent to each other.

Figure 4:
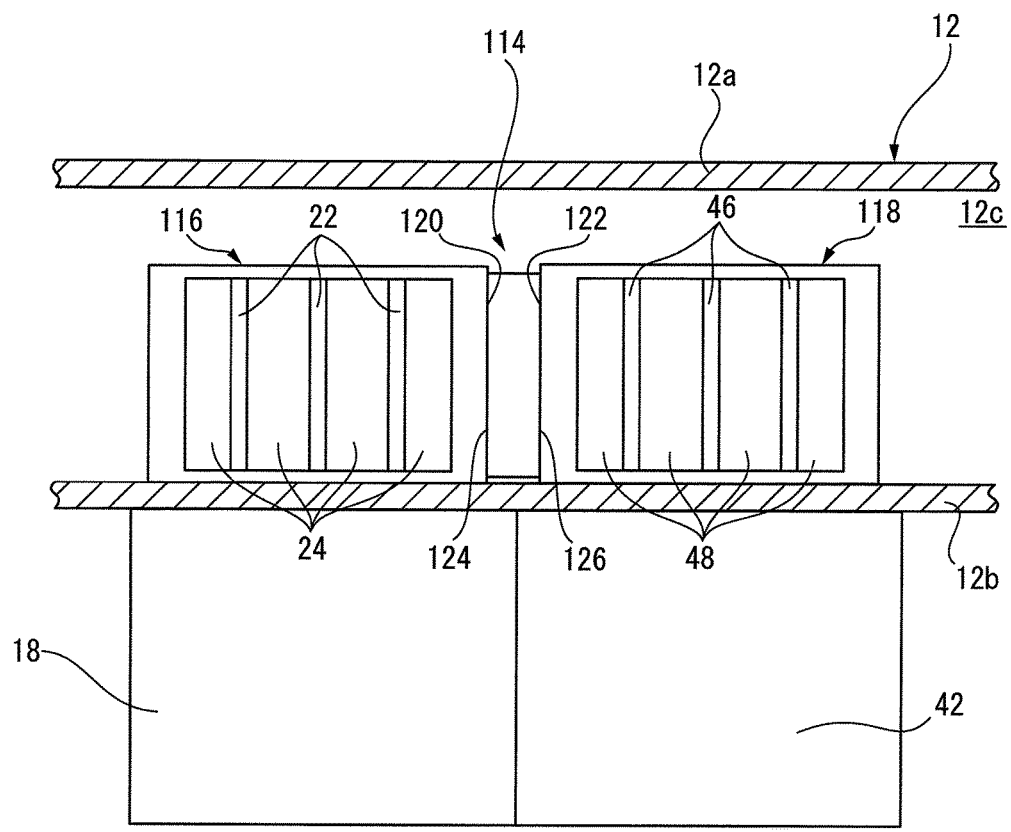
FIG. 4 is an enlarged view of a motor drive device assembly according to still another embodiment.

FIG. 4 shows an enlarged view of a first motor drive device 112A and a second motor drive device 112B among the plurality of motor drive devices 112, which are arranged adjacent to each other in the left-right direction.

The first motor drive device 112A includes the casing 18, the electronic elements (not shown) housed in the casing 18, and a (first) heatsink 116 attached to the front side of the casing 18. The heatsink 116 includes the plurality of radiator fins 22, and the flow path 24 is defined between two radiator fins 22 adjacent to each other in the left-right direction.

The second motor drive device 112B includes the casing 42, the electronic elements (not shown) housed in the casing 42, and a (second) heatsink 118 attached to the front side of the casing 42. The heatsink 118 includes the plurality of radiator fins 46, and the flow path 48 is defined between two radiator fins 46 adjacent to each other in the left-right direction.

Similar as the foregoing embodiments, the panel 12b of the control panel locker 12 extends through the connection between the casing 18 and the heatsink 116, and through the connection between the casing 42 and the heatsink 118.

The connection part 114 is comprised of a thermally conductive member separated from the heatsinks 116 and 118. The connection part 114 is interposed between the heatsink 116 and the heatsink 118 so as to contact the heatsinks 116 and 118.

A left end face 124 of the connection part 114 is adhered to a right end face 120 of the heatsink 116 via a thermally conductive adhesive. Similarly, a right end face 126 of the connection part 114 is adhered to a left end face 122 of the heatsink 118 via a thermally conductive adhesive.

Thus, the heatsinks 116 and 118 are connected to each other via the connection part 114. Through the connection part 114, thermal conduction between the heatsink 116 and the heatsink 118 can be realized. As a result, a heatsink assembly, which has a larger cooling capacity than each of the heatsinks 116 and 118, is constituted.

According to this embodiment, even under an operational condition in which the power consumption of the first motor drive device 112A is larger than that of the second motor drive device 112B, the temperatures of the heatsinks 116 and 118 can be uniformized.

Therefore, the temperatures of the electronic elements of the first and second motor drive devices 112A and 112B can be uniformized. Consequently, it is possible to prevent differences in the service lives of the electronic elements in the first and second motor drive devices 112A and 112B from being occurred.

Figure 5:
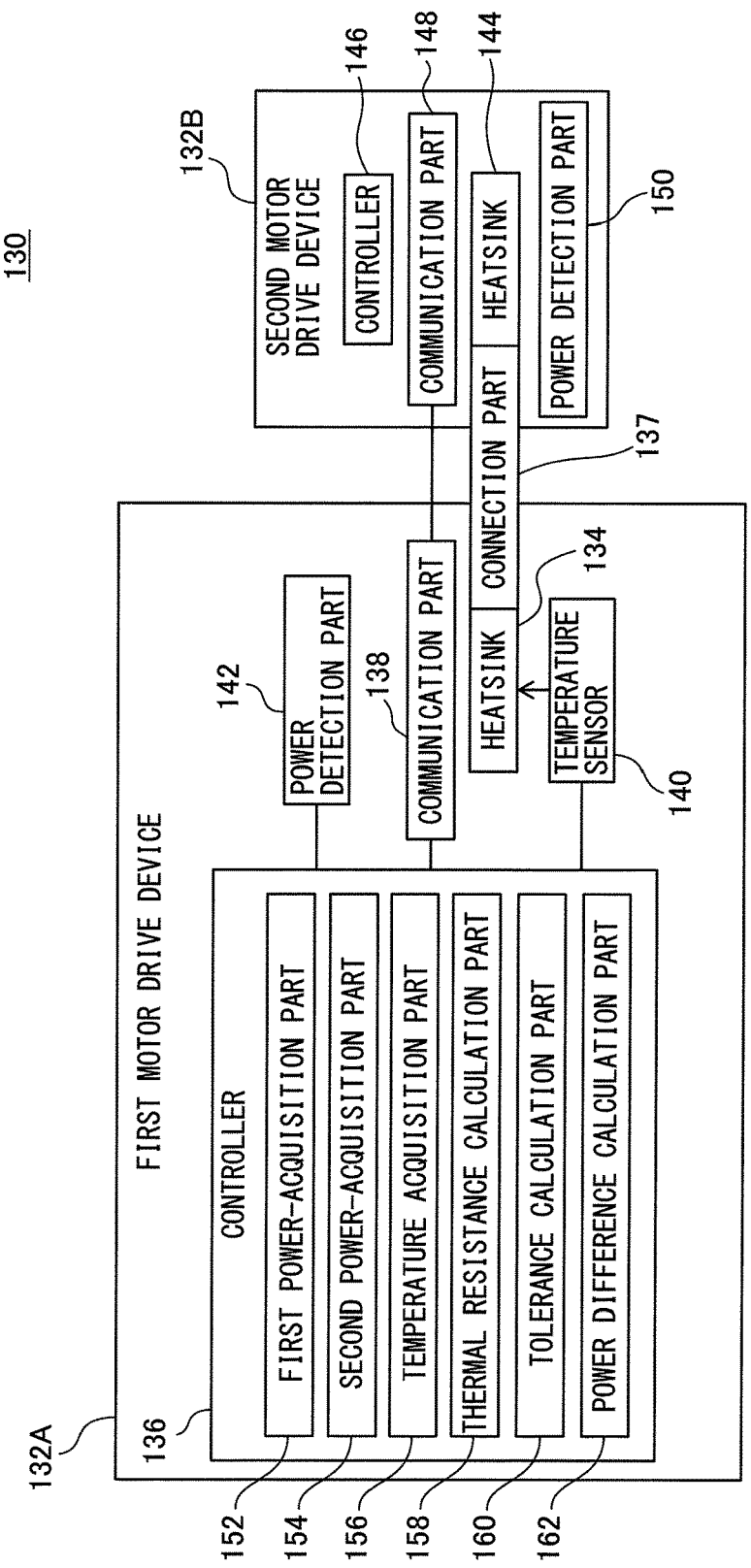
FIG. 5 is a block diagram of a motor drive device assembly according to still another embodiment.

Next, referring to FIG. 5, a motor drive device assembly 130 according to still another embodiment will be described. The motor drive device assembly 130 includes a first motor drive device 132A, a second motor drive device 132B, and a connection part 137.

The first motor drive device 132A includes a heatsink 134, a controller 136, a communication part 138, a temperature sensor 140, and a power detection part 142. The first motor drive device 132A may have a configuration the same as e.g. the above-mentioned first motor drive device 14A, 72A, or 112A. In this case, the heatsink 134 may have a configuration the same as the above-mentioned heatsink 20, 76, or 116.

The controller 136 includes e.g. a CPU and storage, and is mounted in a casing (e.g., the casing 18) of the first motor drive device 132A. The controller 136 directly or indirectly controls each components of the first motor drive device 132A.

The communication part 138 is connected to a communication part 148 provided in the second motor drive device 132B so as to be able to communicate with the communication part 148. The communication part 138 communicates with the communication part 148 in a wired or wireless manner.

The temperature sensor 140 includes e.g. a thermocouple or platinum resistance thermometer sensor, and detects a temperature of the heatsink 134 in accordance with a command from the controller 136. The temperature sensor 140 sends data of detected temperature to the controller 136.

The power detection part 142 detects the power consumption of the electronic elements mounted in the first motor drive device 132A, in accordance with a command from the controller 136. The power detection part 142 sends data of detected power consumption to the controller 136.

As an example, a plurality of power detection parts 142 may be installed, and each of the power detection parts 142 may detect the power consumption of one of the electronic elements (e.g., power element). Alternatively, a single power detection part 142 may be installed so as to detect total power consumption of a whole power amplifier comprised of a plurality of electronic elements.

The second motor drive device 132B includes a heatsink 144, a controller 146, the communication part 148, and a power detection part 150. The second motor drive device 132B have a configuration the same as e.g. the above-mentioned second motor drive device 14B, 72B, or 112B. In this case, the heatsink 144 may have a configuration the same as the above-mentioned heatsink 44, 86, or 118.

The controller 146 includes e.g. a CPU and storage, and is mounted in a casing (e.g., the casing 42) of the second motor drive device 132B. The controller 146 directly or indirectly controls each components of the second motor drive device 132B.

As stated above, the communication part 148 is connected to the communication part 138 of the first motor drive device 132A so as to be able to communicate with the communication part 138 in a wired or wireless manner. The power detection part 150 detects the power consumption of electronic elements mounted in the second motor drive device 132B, and sends data of detected power consumption to the controller 146.

The connection part 137 connects the heatsink 134 of the first motor drive device 132A and the heatsink 144 of the second motor drive device 132B to each other, so as to allow thermal conduction therebetween. The connection part 137 may have a configuration the same as the above-mentioned connection part 66, 74, or 114.

Next, referring to FIG. 6, an example of an operation flow of the first motor drive device 132A will be described. The flow shown in FIG. 6 is started when the controller 136 of the first motor drive device 132A receives from an operator or host controller (e.g., machine tool controller) a command for driving a servomotor incorporated in a machine tool or the like.

At step S1, the controller 136 starts to supply electric power to the servomotor incorporated in the machine tool or the like. Specifically, the controller 136 generates electric power by the electronic elements, such as a power element, and outputs the generated power to the servomotor in the machine tool or the like, in accordance with a processing program.

At step S2, the controller 136 acquires power consumption $P_1$ of the first motor drive device 132A. Specifically, the controller 136 sends a command to the power detection part 142 so as to detect the power consumption $P_1$ of the electronic elements mounted in the first motor drive device 132A, and acquires the data of the power consumption $P_1$ from the power detection part 142.

Thus, in this embodiment, the controller 136 functions as a first power-acquisition part 152 (FIG. 5) which acquires the power consumption $P_1$ of the first motor drive device 132A.

At step S3, the controller 136 acquires power consumption $P_2$ of the second motor drive device 132B. Specifically, the controller 136 transmits a power request command for requesting the power consumption $P_2$ of the second motor drive device 132B to the communication part 148 of the second motor drive device 132B through the communication part 138.

When the controller 146 of the second motor drive device 132B receives the power request command through the communication part 148, the controller 146 sends a command to the power detection part 150 so as to detect the power consumption $P_2$ of the electronic elements in the second motor drive device 132B.

Then, the controller 146 acquires the data of the power consumption $P_2$ from the power detection part 150, and transmits it to the communication part 138 of the first motor drive device 132A through the communication part 148. The controller 136 of the first motor drive device 132A acquires the power consumption $P_2$ of the second motor drive device 132B through the communication part 138.

Thus, in this embodiment, the controller 136 functions as a second power-acquisition part 154 (FIG. 5) which acquires the power consumption $P_2$ of the second motor drive device 132B.

At step S4, the controller 136 acquires the temperature of the heatsink 134. Specifically, the controller 136 sends a command to the temperature sensor 140 so as to detect the temperature T of the heatsink 134.

Then, the controller 136 acquires data of the temperature T from the temperature sensor 140. Thus, in this embodiment, the controller 136 functions as a temperature acquisition part 156 (FIG. 5) which acquires the temperature T of the heatsink 134.

At step S5, the controller 136 calculates a combined thermal resistance Z of the heatsink assembly comprised of the heatsinks 134 and 144. Specifically, the controller 136 calculates a total power consumption $P_T$ (=$P_1+P_2$) of the power consumption $P_1$ acquired at step S2 and the power consumption $P_2$ acquired at step S3.

Then, the controller 136 substitutes the calculated total power consumption $P_T$, the temperature T acquired at step S4, and a reference temperature $T_0$ in following Equation 1, so as to calculate the combined thermal resistance Z.

$$Z=(T-T_0)/P_T \quad \text{(Equation 1)}$$

Note that, the reference temperature $T_0$ may be a temperature measured by the temperature sensor 140 before electric power is applied to the electronic elements in the first motor drive device 132A. Alternatively, the reference temperature $T_0$ may be an atmospheric temperature around the motor drive device assembly 130.

Thus, in this embodiment, the controller 136 functions as a thermal resistance calculation part 158 (FIG. 5) which calculates the combined thermal resistance Z based on the total power consumption $P_T$ and the temperature T.

At step S6, the controller 136 calculates tolerance $P_{MAX}$ of the total power consumption of the first motor drive device 132A and the second motor drive device 132B.

Here, an allowable temperature $T_{MAX}$ for the electronic elements built in the first and second motor drive devices 132A and 132B is predetermined. The allowable temperature $T_{MAX}$ is pre-stored in the storage provided in the controller 136.

At this step S6, the controller 136 substitutes the allowable temperature $T_{MAX}$ (e.g., lowest one of the allowable temperatures of the respective electronic elements), the reference temperature $T_0$, and the combined thermal resistance Z calculated at step S5 in following Equation 2, so as to calculate the tolerance $P_{MAX}$.

$$P_{MAX}=(T_{MAX}-T_0)/Z \quad \text{(Equation 2)}$$

Thus, in this embodiment, the controller 136 functions as a tolerance calculation part 160 (FIG. 5) which calculates the tolerance $P_{MAX}$ of the total power consumption $P_T$ based on the combined thermal resistance Z and the allowable temperature $T_{MAX}$.

At step S7, the controller 136 calculates a difference $\delta_P$ (=$P_{MAX}-P_T$) between the tolerance $P_{MAX}$ calculated at step S6 and the total power consumption $P_T$ calculated at step S5. Thus, in this embodiment, the controller 136 functions as a power difference calculation part 162 (FIG. 5) which calculates the difference $\delta_P$ between the tolerance P and the total power consumption $P_T$.

At step S8, the controller 136 determines whether the difference $\delta_P$ calculated at step S7 is smaller than a predetermined threshold value $\alpha$. For example, the threshold value $\alpha$ may be pre-stored in the storage built in the controller 136.

At this step S8, the controller 136 reads out the threshold value $\alpha$ from the storage, and compares it with the absolute value ($|\delta_P|$) of the difference $\delta_P$ calculated at step S7. When $|\delta_P|$ is smaller than the threshold value $\alpha$ (i.e., $|\delta_P|<\alpha$), the controller 136 determines "YES", and proceeds to step S9. On the other hand, when $|\delta_P|$ is equal to or larger than the threshold value $\alpha$ (i.e., $|\delta_P|\geq\alpha$), the controller 136 determines "NO", and proceeds to step S10.

At step S9, the controller 136 generates an alarm signal indicating that the total power consumption $P_T$ of the first and second motor drive devices 132A and 132B is close to the tolerance $P_{MAX}$.

For example, the controller 136 may generate the alarm signal in the form of an audio signal, and output it to the operator via a speaker (not shown). Alternatively, the controller 136 may generate the alarm signal in the form of an image signal, and output it to the operator via a display (not shown).

At step S10, the controller 136 determines whether it has received from the operator or host controller an end command for ending driving the servomotor. When the controller 136 has received the end command, the controller 136 determines "YES", and proceeds to step S11. On the other hand, when the controller 136 has not received the end command, the controller 136 determines "NO", and returns to step S2.

At step S11, the controller 136 stops to supply the electric power to the servomotor incorporated in the machine tool or the like, thereby ends the operation flow shown in FIG. 6.

As described above, in this embodiment, the controller 136 acquires the power consumption $P_2$ through communication with the controller 146 of the second motor drive device 132B, and calculates the total power consumption $P_T$. Then, the controller 136 calculates the combined thermal resistance Z based on the total power consumption $P_T$ and the temperature T (step S5).

According to this configuration, the controller 136 can detect the combined thermal resistance Z of the heatsink assembly comprised of the heatsinks 134 and 144 in real-time with high accuracy, during the operation.

Further, in this embodiment, the controller 136 calculates the tolerance P of the total power consumption of the first and second motor drive devices 132A and 132B, based on the calculated combined thermal resistance Z and the allowable temperature $T_{MAX}$ of the electronic elements (step S6).

According to this configuration, the controller 136 can recognize the tolerance $P_{MAX}$ of the total power consumption of the first and second motor drive devices 132A and 132B in real-time with high accuracy, during the operation.

Further, in this embodiment, the controller 136 calculates the difference $\delta_P$ between the calculated tolerance $P_{MAX}$ and the total power consumption $P_T$ (step S7), and outputs the alarm to the operator (step S9) when it determines that the difference $\delta_P$ is smaller than the threshold value $\alpha$ (i.e., determines "YES" at step S8).

According to this configuration, the operator can automatically and reliably recognize that the temperature of the heatsink assembly comprised of the heatsinks 134 and 144 is close to the allowable temperature T of the electronic elements in the first motor drive device 132A or the second motor drive device 132B.

Note that, the controller 136 may notify the combined thermal resistance Z calculated at step S5, the tolerance $P_{MAX}$ calculated at step S6, or the difference $\delta_P$ calculated at step S7 to the operator in real-time via a display (not shown).

Further, when it is determined "YES" at above-mentioned step S8, the controller 136 may change an operation mode of the first motor drive device 132A so as to reduce the power consumption of the first motor drive device 132A (i.e., output power of the first motor drive device 132A), along with displaying the alarm at step S9.

In this case, the controller 136 of the first motor drive device 132A and the controller 146 of the second motor drive device 132B may communicate with each other so as to adjust a ratio of the output power of the first motor drive device 132A to the output power of the second motor drive device 132B.

As an example, if the power consumption of the first motor drive device 132A is 40 W while that of the second motor drive device 132B is 100 W, the controller 136 may increase the output power of the first motor drive device 132A, while the controller 146 may reduce the output power of the second motor drive device 132B.

According to this configuration, it is possible to maximize the output power, along with preventing the electronic elements in the first and second motor drive devices 132A and 132B from being broken down.

Further, the temperature sensor 140 may be arranged so as to acquire the temperature T of the heatsink 144 of the second motor drive device 132B. In this case, the controller 136 acquires the temperature T of the heatsink 144 at step S4, and calculates the combined thermal resistance Z based on the acquired temperature T.

Alternatively, the second motor drive device 132B may include other temperature sensor configured to be capable of detecting the temperature T of the heatsink 144, wherein the other temperature sensor may transmit the temperature data to the controller 146 of the second motor drive device 132B.

In this case, at step S4, the controller 136 of the first motor drive device 132A communicates with the controller 146 of the second motor drive device 132B so as to acquire the temperature T of the heatsink 144 detected by the other temperature sensor.

Note that, in the embodiment illustrated in FIG. 2, the connection part 66 includes the first engaging part (protrusion 38, recess 40) formed at the heatsink 20 and the second engaging part (recess 56, protrusion 52) formed at the heatsink 44.

However, the connection part may be configured to connect the heatsink 20 and the heatsink 44 directly to each other by the action of magnetic force. In this case, the connection part may include a first magnet provided on the right end face 34 of the heatsink 20, and a second magnet provided on the left end face 50 of the heatsink 44 and able to attract the first magnet.

Further, the connection part may include a fastening tool, such as a bolt, and connect the heatsink 20 and the heatsink 44 directly to each other via the fastening tool.

Further, in the embodiment illustrated in FIG. 3, the connection part 74 and the heatsink 76 (or heatsink 86) may be directly coupled to each other by the action of magnetic force. In this case, a first magnet is provided on the left end face 104 of the main body 96, while a second magnet able to attract the first magnet is provided on the right end face 82 of the heatsink 76.

Further, in the embodiment illustrated in FIG. 4, the connection part 114 may only include a thermally conductive adhesive which adheres the heatsink 116 to the heatsink 118. In this case, the heatsink 116 and the heatsink 118 are adhered to each other via the thermally conductive adhesive.

Although the invention has been described with reference to the foregoing embodiments of the invention, the embodiments are not intended to limit the invention according to scope of the claims. Although combinations of features described in the embodiments of the invention may be included in the technical scope of the invention, all of the combinations of features may not always be indispensable for the solution of problems to which the invention is addressed. Further, it is obvious to persons skilled in the art that various modifications or improvements may be made to the foregoing embodiments.

Further, it is to be noted that, actions, procedures, steps, processes, and stages and the like in the device, the system, the program, and the method described in the claims, the description, and the drawings may be realized in a desired order, unless a specific expression such as "before" or "prior to" is used, and unless an output of a preceding process is utilized in a subsequent process. Even though such expressions as "first", "next", "successively" and "then" are used for the sake of convenience in the claims, the description, and the operation flow in the drawings, such expressions are not intended to mean that it is mandatory to execute the process in the mentioned order.

The invention claimed is:

1. A motor drive device comprising:
   a first heatsink;
   a first power-acquisition part which acquires power consumption of the motor drive device;
   a communication part which communicates with a second motor drive device including a second heatsink connected to the first heatsink via a connection part which allows thermal conduction between the first heatsink and the second heatsink;
   a second power-acquisition part which acquires power consumption of the second motor drive device via the communication part;
   a temperature acquisition part which acquires a temperature of the first heatsink or the second heatsink;
   a thermal resistance calculation part which calculates combined thermal resistance of the first heatsink and the second heatsink, based on total power consumption of the power consumption of the motor drive device and the power consumption of the second motor drive device and on the temperature acquired by the temperature acquisition part; and
   a tolerance calculation part which calculates tolerance of the total power consumption of the motor drive device and the second motor drive device, based on the combined thermal resistance calculated by the thermal resistance calculation part and on a predetermined allowable temperature of the motor drive device.

2. The motor drive device according to claim 1, further comprising a power difference calculation part which calculates a difference between the tolerance calculated by the tolerance calculation part and the total power consumption.

3. The motor drive device assembly according to claim 1, wherein the connection part directly connects the first heatsink and the second heatsink.

4. The motor drive device assembly according to claim 3, wherein the connection part detachably connects the first heatsink and the second heatsink.

5. The motor drive device assembly according to claim 4, wherein the connection part includes:
   a first engaging part formed at the first heatsink; and
   a second engaging part formed at the second heatsink and releasably engaging the first engaging part.

6. The motor drive device assembly according to claim 1, wherein the connection part includes a thermally conductive member separated from the first heatsink and the second heatsink and interposed between the first heatsink and the second heatsink so as to contact the first heatsink and the second heatsink.

7. The motor drive device assembly according to claim 6, wherein the thermally conductive member is detachably connected to the first heatsink and the second heatsink.

8. The motor drive device assembly according to claim 6, wherein the thermally conductive member includes a radiator fin.

* * * * *